(12) United States Patent
Lemke et al.

(10) Patent No.: US 10,072,916 B2
(45) Date of Patent: Sep. 11, 2018

(54) METHODS AND APPARATUS FOR MAKING MOLDED OBJECTS, AND MOLDED OBJECTS MADE THEREFROM

(71) Applicant: PolyCase Ammunition, LLC, Savannah, GA (US)

(72) Inventors: Paul Lemke, Savannah, GA (US); Juan Carlos Marin, Ripoll (ES)

(73) Assignee: Quantum Ammunition, LLC, Savannah, GA (US)

( * ) Notice: Subject to any disclaimer, the term of this patent is extended or adjusted under 35 U.S.C. 154(b) by 0 days.

(21) Appl. No.: 15/110,948

(22) PCT Filed: Jan. 14, 2015

(86) PCT No.: PCT/US2015/011483
§ 371 (c)(1),
(2) Date: Jul. 12, 2016

(87) PCT Pub. No.: WO2015/109033
PCT Pub. Date: Jul. 23, 2015

(65) Prior Publication Data
US 2016/0332349 A1    Nov. 17, 2016

(30) Foreign Application Priority Data
Jan. 14, 2014  (ES) .................. 201430028

(51) Int. Cl.
*F42B 33/00*    (2006.01)
*F42B 5/30*    (2006.01)
(Continued)

(52) U.S. Cl.
CPC ........ *F42B 33/00* (2013.01); *B29C 45/14336* (2013.01); *B29C 45/4421* (2013.01);
(Continued)

(58) Field of Classification Search
CPC .. F42B 5/30; F42B 5/307; F42B 5/313; F42B 33/00; F42B 33/001; B29C 45/44;
(Continued)

(56) References Cited

U.S. PATENT DOCUMENTS 3,159,701 A * 12/1964 Herter .................. B29C 45/26
249/66.1
3,276,375 A * 10/1966 Larson .................. B29C 45/56
102/466

(Continued)

FOREIGN PATENT DOCUMENTS

WO    2013/096848    6/2013

OTHER PUBLICATIONS

PCT/US2015/011483 International Search Report and Written Opinion dated Mar. 5, 2015.
EP Application No. 15 703 153.5, Office Action and Search Results, dated Jan. 9, 2018.

*Primary Examiner* — James S Bergin
(74) *Attorney, Agent, or Firm* — Withers & Keys, LLC

(57) ABSTRACT

Methods of making molded objects, such as composite ammunition casings for firearms, are disclosed. Apparatus for performing methods of making molded objects, such as composite ammunition casings for firearms, are also disclosed. Molded objects, such as composite ammunition casings for firearms, are further disclosed.

17 Claims, 10 Drawing Sheets

(51) Int. Cl.
*B29C 45/44* (2006.01)
*B29C 45/14* (2006.01)
*B29L 31/00* (2006.01)
*B29K 77/00* (2006.01)
*B29K 705/00* (2006.01)

(52) U.S. Cl.
CPC .............. *F42B 5/30* (2013.01); *F42B 33/001* (2013.01); *B29K 2077/00* (2013.01); *B29K 2705/00* (2013.01); *B29L 2031/7772* (2013.01)

(58) Field of Classification Search
CPC .......... B29C 45/4421; B29C 45/14336; B29C 33/48; B29L 2031/7772
USPC ........ 102/464, 465, 466, 467; 86/19.5, 19.6, 86/19.7
See application file for complete search history.

(56) References Cited

U.S. PATENT DOCUMENTS

| | | | | |
|---|---|---|---|---|
| 3,345,438 A | * | 10/1967 | Carey | ................... B29C 33/485 249/177 |
| 3,491,691 A | * | 1/1970 | Vawter | ................... B29C 43/00 102/467 |
| 3,749,021 A | * | 7/1973 | Burgess | ................... F42B 5/30 102/467 |
| 4,187,271 A | | 2/1980 | Philipps et al. | |
| 4,286,766 A | | 9/1981 | Von Holdt | |
| 6,845,716 B2 | | 1/2005 | Husseini | |
| 9,032,855 B1 | * | 5/2015 | Foren | ...................... F42B 33/00 102/466 |
| 2009/0152770 A1 | * | 6/2009 | Mikac | ................. B29C 45/4421 264/334 |

* cited by examiner

METHODS AND APPARATUS FOR MAKING MOLDED OBJECTS, AND MOLDED OBJECTS MADE THEREFROM

This application is being filed as the national stage patent application of PCT International Patent Application No. PCT/US2015/011483, filed on 14 Jan. 2015, and claiming priority to Spanish Provisional Patent Application Serial No. P201430028, filed on 14 Jan. 2014, and entitled "Single-piece/Integral-Body Polymer Composite Rifle Cartridge Case with Internal Bottle Shape, Overmolded onto a Metallic Insert, and Method of Fabrication of the Same," the contents of both of which is incorporated herein by reference in its entirety

FIELD OF THE INVENTION

The present invention relates to methods and apparatus for making molded objects such as ammunition for firearms. The present invention also relates to molded objects made by the methods disclosed herein, as well as methods of using molded objects.

BACKGROUND OF THE INVENTION

The production of plastic ammunition casings seeks, among other objectives, the reduction of weight and cost. A plastic ammunition casing, versus its equivalent in brass, can reduce weight up to 60% and, in the overall weight of the assembled ammunition, may represent a decrease of total weight of 20% on average.

The high cost of copper and market variability makes the price of the raw material have large oscillations, which does not happen so severely in plastics.

The use of plastic materials for the manufacture of ammunition casings is not a new idea. In the 1950's, U.S. Pat. No. 2,654,319 (ROSKE) and U.S. Pat. No. 2,862,446 (RINGDAL) proposed designs and methods for the manufacture of these components with polymeric materials.

From those early developments to the most recent attempts, as discussed in U.S. Pat. No. 6,845,716 (HUSSEINI, BYRON) and U.S. Pat. No. 7,213,519 (WILEY, REMBERT, LOFTIN), which were the start of companies like NATEC or POLITECH respectively, started from the idea that the casing head must be made of metal to ensure strength.

More recent proposals such as US20130014664 (PADGETT), US20120180688 (PADGETT) WO2012/947615 (DAVIES, COCO) or US20070261587 (CHUNG) also incorporate a metal bushing in the casing using different techniques.

However, all the above proposals, when applied to the manufacture of ammunition casings with shoulder, i.e., bottle shaped, in order to maximize the inner space, need several parts in different combinations to form the entire casing. The reason is the difficulty to release the undercut that forms the inner surface.

Considering the small size of the parts and the mechanical strength of the mold needed to hold the pressure used during the injection process, known techniques make it impossible to solve the undercut with mechanical movements. Then, to make a constant wall thickness along the external shape to maximize space for the powder, the body that contains the metal bushing and the part that contains the shoulder are injected separately and then bonded by welding or adhesive.

On one hand, the pressures which occur within the ammunition casing while shooting in conjunction with the temperature of the chamber, makes softer the weld zone, particularly when it remains for a long interval of time in the hot chamber before shot. On the other hand, the fact that the casing is composed of several pieces joined together does not guarantee the sealing and makes the cartridge more sensitive to suffer mechanical breakage.

What is need in the art is a method of making molded objects, such as ammunition casings, that enable the formation of a molded object without the problems noted above in the prior art. What is further need in the art is an apparatus capable of making molded objects, such as ammunition casings, that enable the formation of a molded object without the problems noted above in the prior art.

SUMMARY OF THE INVENTION

The present invention addresses some of the difficulties and problems discussed above by the discovery of new methods and apparatus for making molded objects, such as an ammunition casing. In some embodiments, the present invention concerns the design and manufacturing process of molded objects such as ammunition casings (1) made of polymer with a metal bushing overmolded in a head area of the casing, (2) having a bottle shape with constant wall thickness, (3) obtained in only one step during an injection molding process, (4) so as to provide an industrial process solution to the problem discussed above.

The apparatus and methods of the present invention enable the production of molded object, such as an ammunition casing, with one or more of the following benefits: (1) the ability to remove an inner core mandrel apparatus member following formation of the molded object; and (2) in the case of ammunition casings, the ability to provide ammunition casings that are about 30% lighter than conventional bullets, which translates into lower shipping costs, higher velocities and less recoil.

Accordingly, in one exemplary embodiment, the present invention is directed to methods of making a molded object, such as ammunition casings. In some exemplary embodiments of the present invention, the method of making a molded object comprises: overmolding a removable core mandrel (also referred to herein as "a retractable core mandrel") with at least one polymer or polymer-forming material, the at least one polymer or polymer-forming material forming a polymer shell in contact with an outer profile surface of the removable core mandrel; and separating the removable core mandrel from the polymer shell to form the molded object; wherein said separating step comprises (i) reducing a cross-sectional outer mandrel dimension of the removable core mandrel from an initial cross-sectional outer mandrel dimension $d_{omi}$ to a final cross-sectional outer mandrel dimension $d_{omf}$ so that the removable core mandrel passes through an internal opening within the polymer shell, the internal opening having a cross-sectional opening dimension $d_o$ with $d_{omi} > d_o \geq d_{omf}$.

The present invention is further directed to apparatus for making molded objects. In some exemplary embodiments of the present invention, the apparatus for making molded objects comprises a removable core mandrel comprising a central core mandrel and a set of one or more connectable mandrel blades, each connectable mandrel blade of the one or more connectable mandrel blades being connectable to the central mandrel core, wherein said removable core mandrel has (i) an initial cross-sectional outer mandrel dimension $d_{omi}$ when said one or more connectable mandrel blades are in a first (i.e., connected) position relative to said central core mandrel, and (ii) a final cross-sectional outer mandrel dimension $d_{omf}$ when said one or more connectable mandrel blades are in a second (i.e., disconnected) position relative to said central core mandrel, with $d_{omi} > d_{omf}$.

The present invention is even further directed to molded objects formed via the herein-disclosed methods and/or using the herein disclosed apparatus. In one exemplary embodiment, the molded object of the present invention comprises a polymer shell and at least one mold insert, wherein said polymer shell extends along at least a portion of an external surface of said at least one mold insert, and said at least one mold insert representing an overmolded end component of said molded object.

These and other features and advantages of the present invention will become apparent after a review of the following detailed description of the disclosed embodiments and the appended claims.

DETAILED DESCRIPTION OF THE INVENTION

Figure 2:
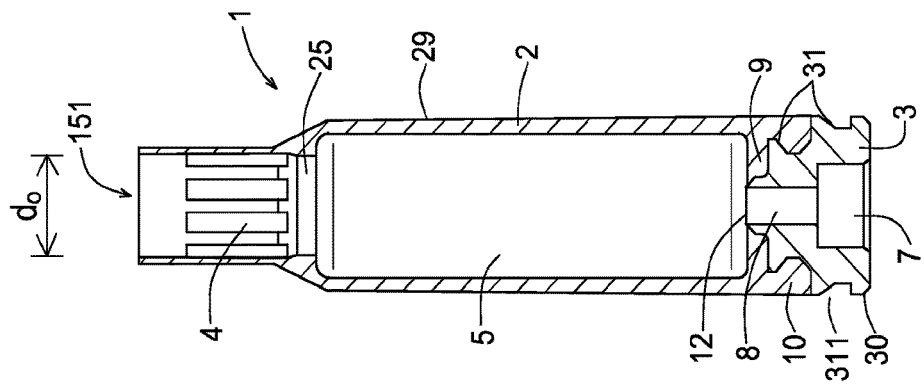
FIG. 2 depicts a sectional view of the exemplary composite ammunition casing of the exemplary assembled ammunition cartridge shown in FIG. 1.

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

The present invention is directed to methods of making molded objects, such as composite ammunition casings suitable for use in ammunition for firearms. The present invention is further directed to apparatus for making molded objects, such as composite ammunition casings suitable for use in ammunition for firearms. The present invention is even further directed to molded objects, such as composite ammunition casings suitable for use in ammunition for firearms.

It should be understood that although the herein described (i) methods of making molded objects, (ii) apparatus for making molded objects, and (iii) molded objects focus on methods and apparatus for making composite ammunition casings suitable for use in ammunition for firearms, the herein described (i) methods of making molded objects, and (ii) apparatus for making molded objects may be used to form any molded object.

Exemplary molded object/composite casing 1 comprises a polymer shell 2 and a metal bushing 3 partially embedded within polymer shell 2. Shell 2, desirably manufactured via thermoplastic injection, provides an external shape to molded object/composite casing 1 according to the dimensions specified in the standard rules for different corresponding caliber ammunition. Exemplary molded object/composite casing 1 comprises cartridge body 20, the cartridge shoulder 22 and the cartridge neck 21

Polymer shell 2 comprises an inner area for projectile adjustment 4 and a powder chamber 5. During an injection process, the polymer shell 2 is integrated, by overmolding, onto the metal bushing 3.

Exemplary metal bushing 3 may be a cylindrical part that maybe machined, cast, sintered or stamped. Exemplary metal bushing 3 includes primer pocket 7, a hole 8 connecting the primer pocket 7 with a powder chamber 5, a reduction of diameter forming a pipe 9 around the hole 8, and a notch 10 along an outside surface 31 of metal bushing 3. Exemplary metal bushing 3 also contains an extraction rim 30 and a conical section 311 suitable for fitting with an extractor (not shown).

Notch 10 is filled with polymer during an injection process of polymer shell 2 so as to ensure an axial position of the metal bushing 3 within exemplary molded object/composite casing 1. Exemplary metal bushing 3 ends with a sharp edge 12 in the area of the pipe 9 to minimize firing pressure on metal bushing 3. Sharp edge 12 also compensates for machining tolerances with regard to an overall length of metal bushing 3, the sharp edge 12 being easily deformed by a mold, ensuring the tightness and avoiding flashes or burrs thereon.

While shooting, the pressure that occurs in the powder chamber 5 causes a projectile 6 to move forward at high speed. The reaction force on the pressure chamber 5 is supported by the polymer shell 2. Radially the polymer shell 2 is supported by the powder chamber 5 avoiding its breakage.

The reaction force (i.e., from shooting) does not act directly on metal bushing 3. It does through the polymer wall 210 surrounding the pipe 9 of metal bushing 3 so if a displacement occurs in the axial direction A (i.e., the direction along axis 157 shown in FIG. 11), the metal bushing 3 and the polymer shell 2 are moved jointly.

Furthermore, the pressure also acts on the primer 11 projected surface. Thus, as the metal bushing 3 is moved integrally with the polymer shell 2, the notches 10 of the metal bushing 3 have to bear only the effort of extraction of the primer 11 due to internal pressure.

The inner surface 410 of the cartridge neck 21 contains a balancing area 40, axial slots 41 and a shelf 42. Shelf 42 prevents the projectile 6, once inserted, from passing into the powder chamber 5. Balancing area 40 receives a fixing adhesive 50 after the projectile 6 is inserted, and the set of vertical slots 41 are used to accommodate the adhesive 50 which fixes the projectile 6.

The axial slots 41 are formed by the space between a set of ribs 43 extending in the axial direction inside the cartridge neck 21. The thickness of each of the ribs 43 and slots 41, which are desirably similar, are desirably uniformly distributed along the inner surface 410 of the cartridge neck 21. The diameter which forms the ribs 43 desirably corresponds to a nominal diameter of the projectile 6 so that projectile 6 is inserted without appreciable interference, with the only limit being the shelf 42.

The projectile 6 can be entered manually, without effort, and if the cartridge is handled carefully, does not have to fall apart before the sealing process. The diameter which forms the bottom of the axial slots 41 is desirably at least about 0.1 mm larger than the diameter of the projectile 6, leaving a space of at least about 0.05 mm to fit the adhesive 50. The diameter forming the balancing area 40 is desirably the same as a diameter formed by the slots 41, i.e., desirably about 0.1 mm more than the diameter of the projectile 6, and the width of the balancing area 40 desirably up to two times the width of the slots 41.

During the loading process, once the projectile 6 is introduced, a certain amount of adhesive 50 may be applied on the projectile 6 in the area near the cartridge neck 21 to fill the balancing area 40. The adhesive 50 desirably has sufficiently low viscosity to penetrate by capillary action. First, the adhesive 50 desirably fills the balancing zone 40 around the projectile 6 and then fills every one of the slots 41 starting at the balance area 40 forming a wet zone around the projectile 6 to ensure fixation.

The adhesive 50 has three functions in the process of assembly of the cartridge. First, the adhesive 50 prevents penetration of air, water and/or dust inside the powder chamber 5 containing the propellant and acts as a sealant. Secondly, the adhesive 50 enables the formation of a chemical bond to ensure fixation projectile 6 to the composite ammunition casing 1 so as to prevent the projectile 6 from accidentally falling out of the composite ammunition casing 1 as a result of vibration, shock or recoil during shooting. Desirably, the adhesive 50 is strong enough to withstand accidental removal efforts, and lightweight enough so that the projectile 6 does not damage or break cartridge neck 21 during shooting.

Finally, the adhesive 50, when hardened, occupies the possible empty spaces that may exist between the outer surface of the projectile 6 and the inner surface 410 of the cartridge neck 21. This improves the fit and even creates a mechanical interference/bond 51 assuring even more the retention of the projectile 6 within composite ammunition casing 1. This interference/bond 51 is particularly important when using projectiles 6 made of or coated with metallic materials due to the large difference in affinity with plastics/polymers.

The mechanical interference/bond 51 that is created, is fixed to the plastic part of the cartridge neck 21, occupies the free spaces between the projectile 6 and the inner surface 410 of the cartridge neck 21 and forms a physical barrier that provides acceptable resistance to accidental removal efforts between the projectile 6 and the cartridge neck 21.

Figure 1:
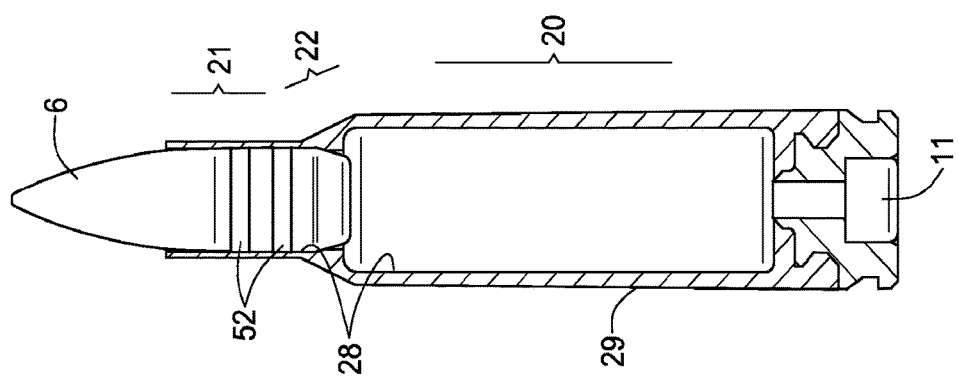
FIG. 1 depicts a sectional view of an exemplary molded object of the present invention, the molded object being an exemplary assembled ammunition cartridge with all its components.

In some embodiments, it is especially useful to use projectiles 6 equipped with crimp grooves 52 (shown in FIG. 1) as it is possible to form a joint fixing ring 53 (shown in FIG. 6) on the cartridge neck 21.

For the manufacturing of exemplary molded object/composite casing 1 itself, the inner surface 28 of the polymer shell 2 is formed using a retractable core mandrel 100 inserted into a mold 150 during insertion of the metal bushing 3. The retractable core mandrel 100 may be (1) extracted with the exemplary molded object/composite casing 1 once injected, (2) disassembled with an external process to separate the retractable core mandrel 100 from the exemplary molded object/composite casing 1, and (3) reassembled for reuse in the next molding step.

The retractable core mandrel 100 is formed by a central core mandrel 101 and a set of connectable mandrel blades 102, which are attachable to the central core mandrel 101 along a geometry 103 that allows movement in one axial direction without disassembly, and movement in an opposite direction to provide disassembly (e.g., a "Dovetail" assembly).

Figure 9A:
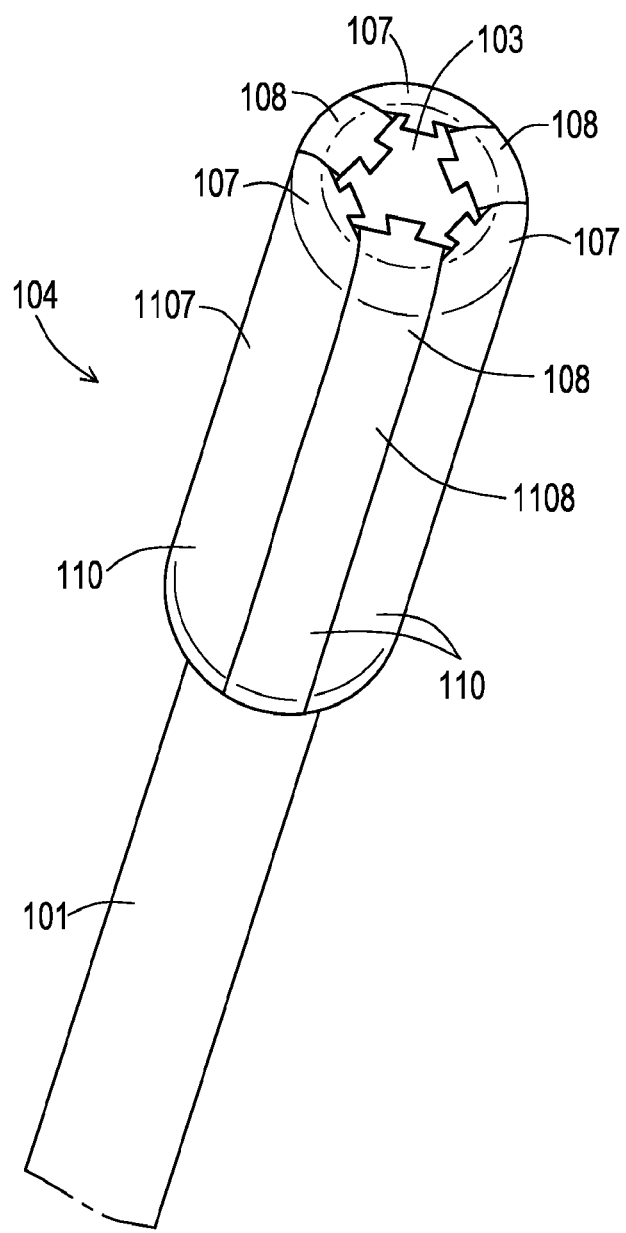
FIGS. 9A-9B depict (A) an exemplary assembled retractable core mandrel, and (B) disassembly of the exemplary assembled retractable core mandrel, respectively, viewing relative movement of connectable mandrel blades supported on an inclined plane/surface of the retractable core mandrel.
Figure 9B:
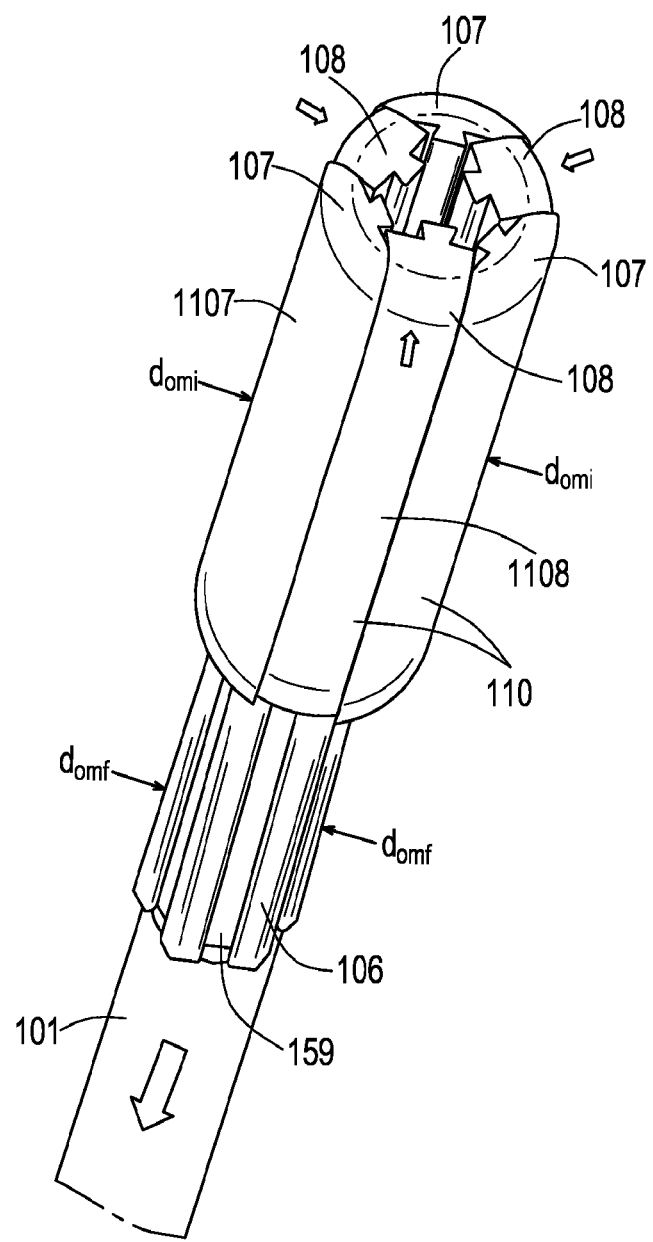

As shown in FIGS. 9A-9B, the whole exemplary assembly of the central core mandrel 101 and the set of connectable mandrel blades 102 forms a cylindrical shape 104 with an inner diameter (i.e., initial cross-sectional outer mandrel dimension $d_{omi}$) greater than the cartridge neck 21 inner diameter (i.e., being greater than or equal to cross-sectional opening dimension $d_o$). The central core mandrel 101) has a lower diameter (i.e., final cross-sectional outer mandrel dimension $d_{omf}$) than the cartridge neck 21 inner diameter (i.e., being greater than or equal to cross-sectional opening dimension $d_o$). The dimensions of each of connectable mandrel blades 102 are also small enough to can pass through the cartridge neck 21 without difficulty.

The number of connectable mandrel blades 102 is determined by at least (1) the size and shape of the cavity within polymer shell 2, and (2) the size and shape of an internal opening 25 within polymer shell 2 such as cartridge neck 21. In the exemplary embodiment shown in FIGS. 9A-9B, half of the connectable mandrel blades 108 are supported by the central core mandrel 101 via an inclined plane/surface 159 so that when the central core mandrel 101 is removed, connectable mandrel blades 108 tend to move inwards (i.e., towards a central axis 157 of central core mandrel 101), unlocking the adjacent connectable mandrel blades 107 that do not have such inclination. In this embodiment, adjacent connectable mandrel blades 107 may be removed by applying a light strain on the outside of the polymer shell 2 of exemplary molded object/composite casing 1, taking advantage of the flexibility of the polymer shell 2 just after injection.

Figure 3B:
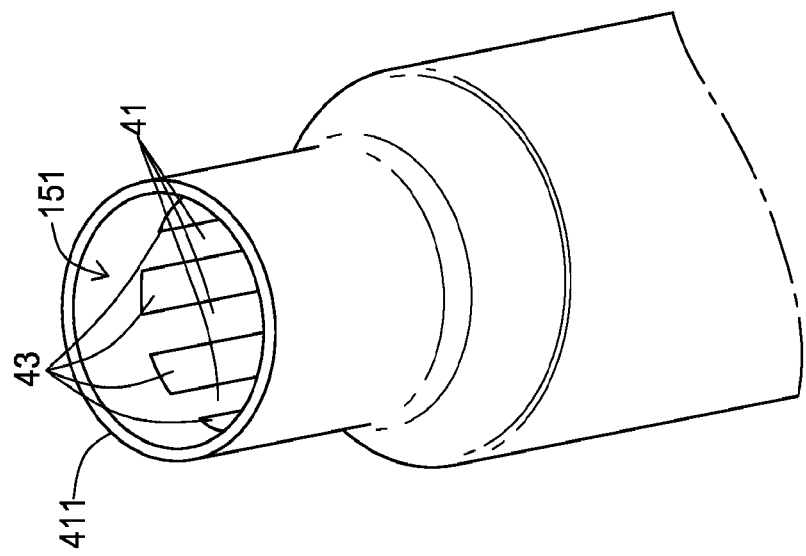
FIGS. 3A-3B depict cross-sectional and perspective views, respectively, of an upper portion of the exemplary composite ammunition casing shown in FIG. 2.
Figure 3A:
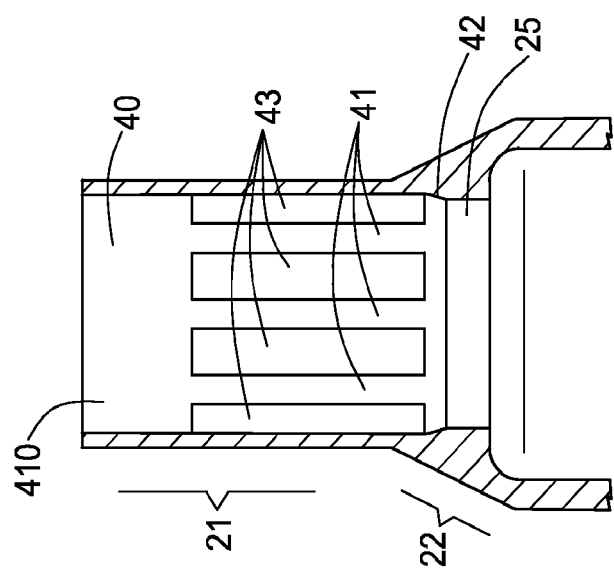
Figure 5:
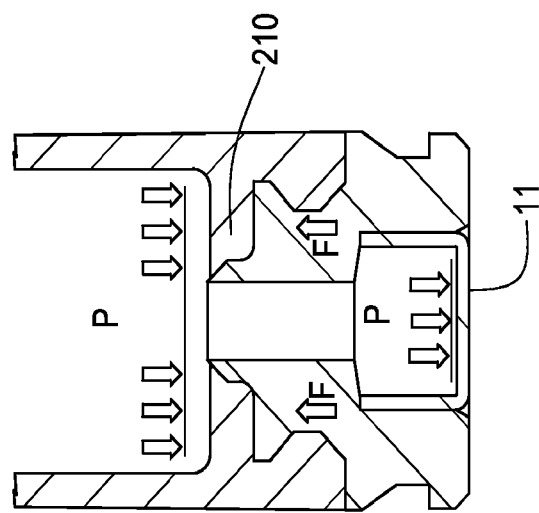
FIG. 5 depicts a sectional view of the effect of pressure on the metal bushing and the primer within the exemplary assembled ammunition cartridge shown in FIG. 1 upon firing from a weapon (e.g., pistol, rifle, etc.)
Figure 4:
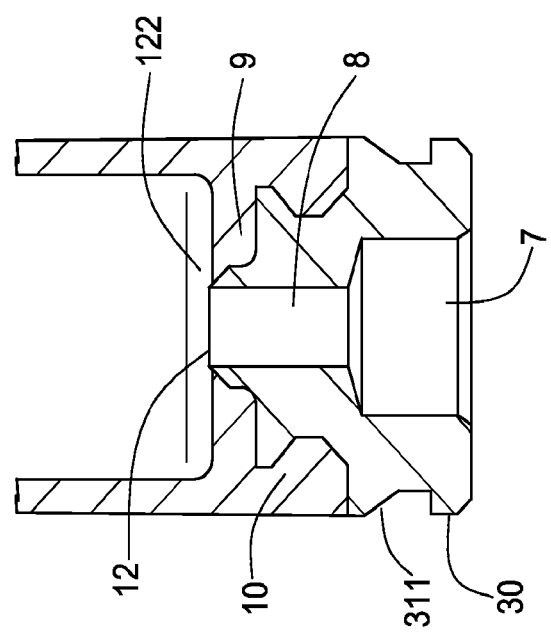
FIG. 4 depicts a sectional view of an exemplary casing head comprising a metal bushing and a polymer shell of the exemplary composite ammunition casing shown in FIG. 2.
Figure 10:
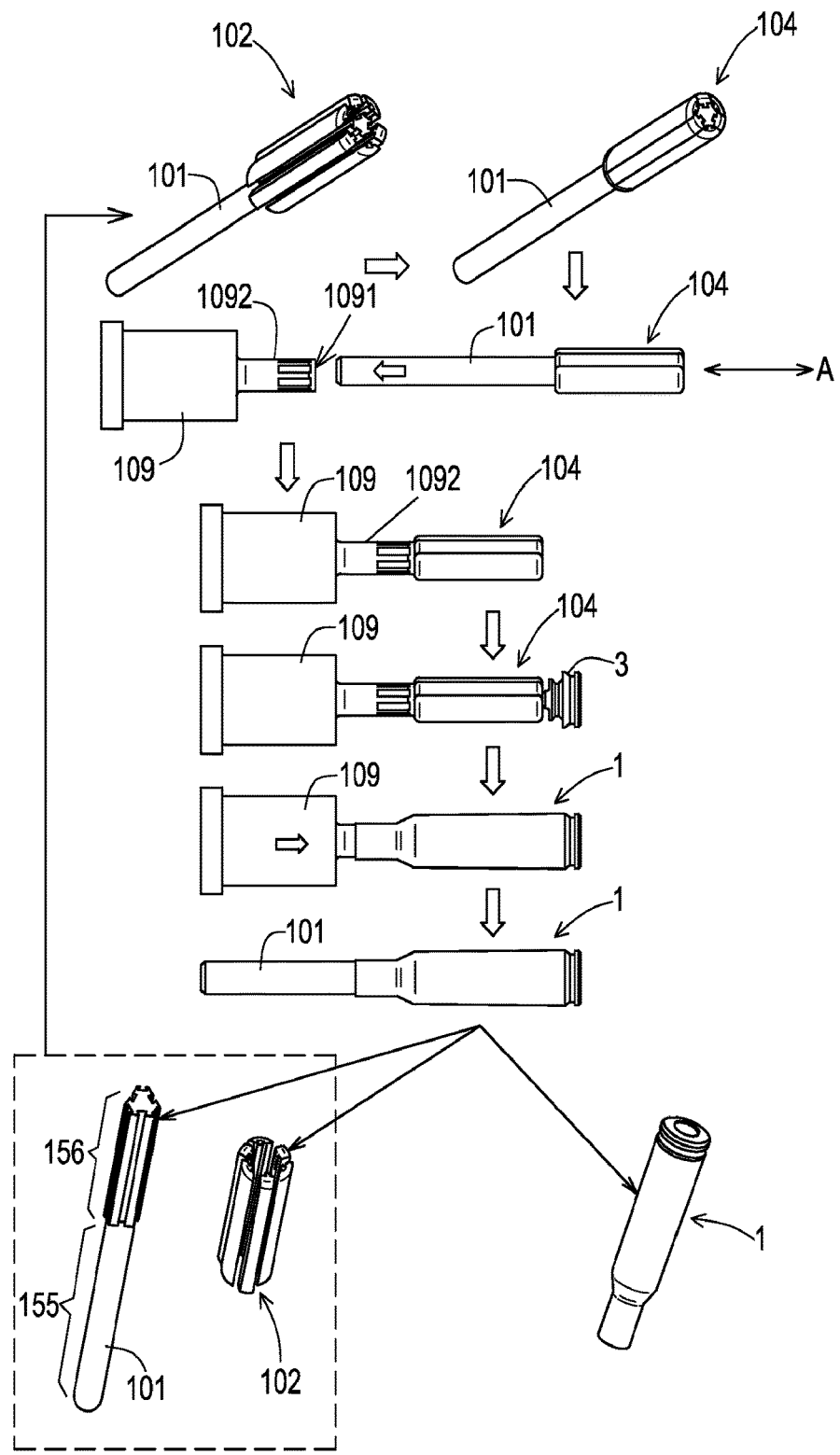
FIG. 10 depicts various stages of an exemplary molding process for forming a molded object, namely, an exemplary composite ammunition casing, of the present invention.
Figure 11:
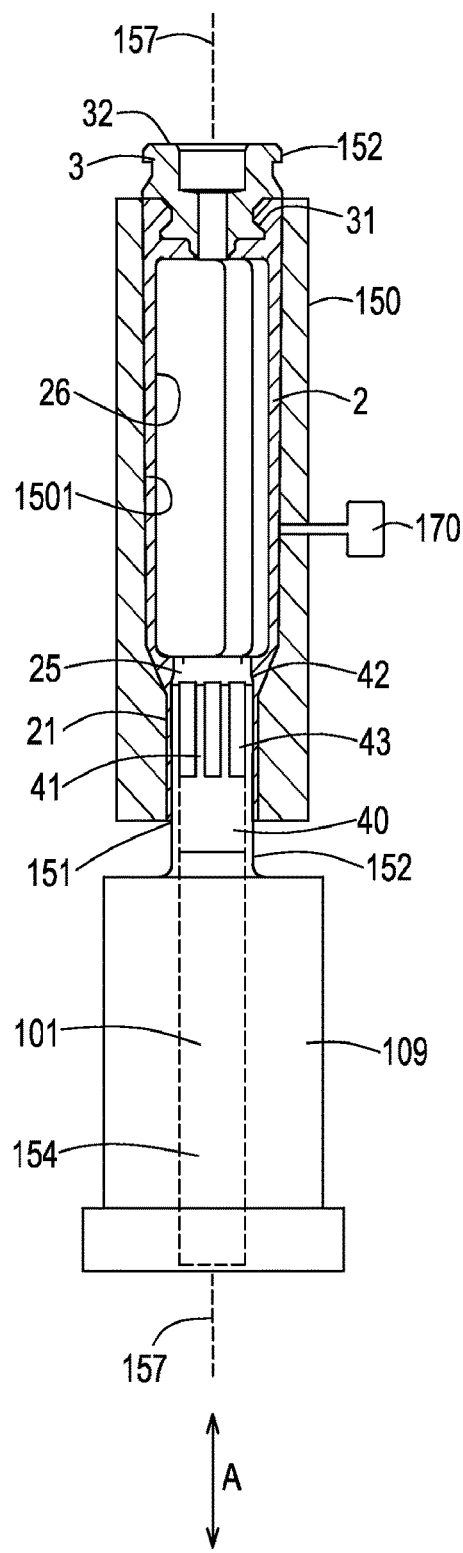
FIG. 11 depicts a sectional view of an exemplary process step in which an exemplary composite ammunition casing is formed using an ejection insert, which holds the central core mandrel in place relative to a mold.

As shown in FIGS. 10-11, the inner diameter of the cartridge neck 21 of exemplary molded object/composite casing 1 is formed by an ejection insert 109, fixed to a mold assembly 150, that contains a hole 1091 therein to fit the retractable core mandrel 100. An outer surface 1092 of the ejection insert 109 also comprises surface features that form the balancing area 40, one or more sealing slots 41 and shelf 42 of exemplary molded object/composite casing 1. See, for example, these surface features in FIGS. 3A-3B.

The methods of making molded objects, apparatus for making molded objects, and the resulting molded objects of the present invention are further described in the embodiments below.

Figure 7A:
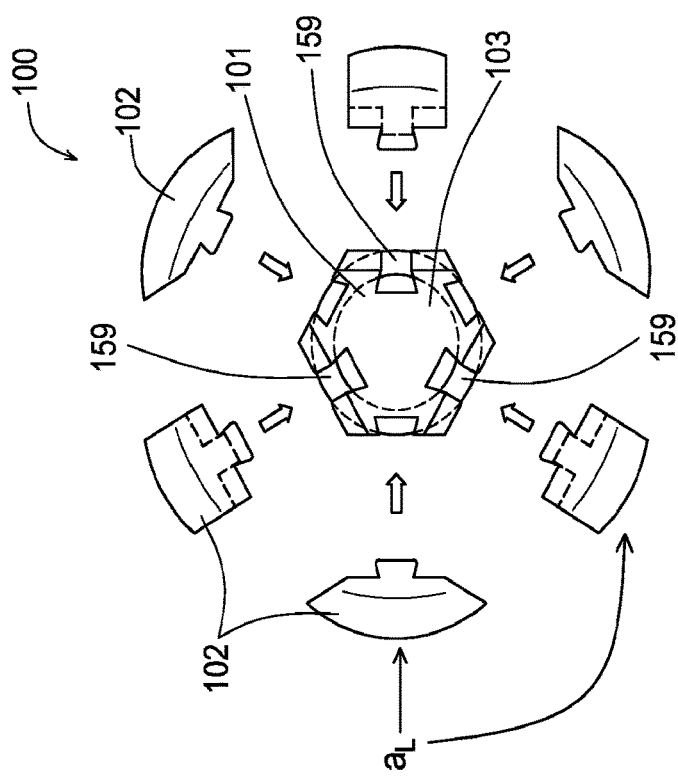
FIGS. 7A-7B depict an exemplary retractable core disassembly and assembly, respectively, suitable for use in the methods of the present invention.
Figure 7B:
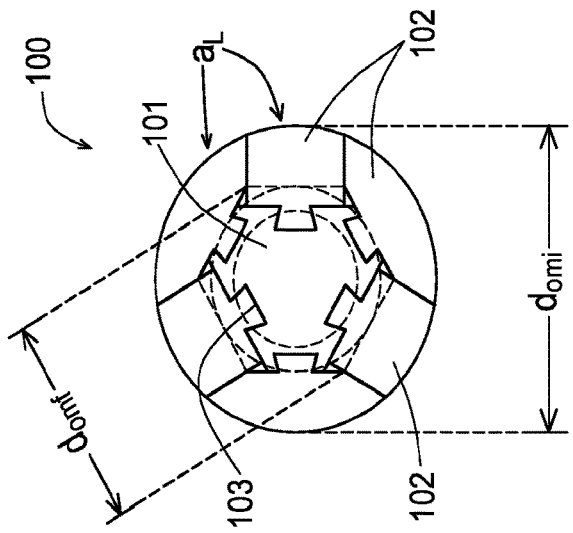

Methods of Making Molded Objects Embodiments:

1. A method of making a molded object 1, said method comprising: overmolding a removable core mandrel 100 with at least one polymer or polymer-forming material, the at least one polymer or polymer-forming material forming a polymer shell 2 in contact with an outer profile surface 110 of the removable core mandrel 100; and separating the removable core mandrel 100 from the polymer shell 2 to form the molded object 1; wherein said separating step comprises (i) reducing a cross-sectional outer mandrel dimension of the removable core mandrel 100 from an initial cross-sectional outer mandrel dimension $d_{omi}$ to a final cross-sectional outer mandrel dimension $d_{omf}$ so that the removable core mandrel 100 passes through an internal opening 25 within the polymer shell 2, the internal opening 25 having a cross-sectional opening dimension $d_o$ with $d_{omi} > d_o \geq d_{omf}$. See, for example, FIGS. 7B and 9B. It should be understood that each of (i) initial cross-sectional outer mandrel dimension $d_{omi}$, (ii) final cross-sectional outer mandrel dimension $d_{omf}$, and (iii) cross-sectional opening dimension $d_o$ may have any dimension as long as $d_{omi} > d_o \geq d_{omf}$. In some embodiments, each of (i) initial cross-sectional outer mandrel dimension $d_{omi}$, (ii) final cross-sectional outer mandrel dimension $d_{omf}$, and (iii) cross-sectional opening dimension $d_o$ is independently up to about 300.0 millimeters (mm) in length (or any length greater than 0 mm and up to and including 300.0 mm, in increments of 0.01 mm, e.g., 53.4 mm, or any range of length greater than 0 mm and up to 300.0 mm, in increments of 0.01 mm, e.g., from about 25.4 mm to about 53.4 mm) In other embodiments, each of (i) initial cross-sectional outer mandrel dimension $d_{omi}$, (ii) final cross-sectional outer mandrel dimension $d_{omf}$, and (iii) cross-sectional opening dimension $d_o$ is independently from about 5.00 mm to about 20.00 mm in length (or any length between 5.00 mm and 20.00 mm, in increments of 0.01 mm, e.g., 5.34 mm, or any range of length between 5.00 mm and 20.00 mm, in increments of 0.01 mm, e.g., from about 5.50 mm to about 15.25 mm) Further, each of (i) initial cross-sectional outer mandrel dimension $d_{omi}$, (ii) final cross-sectional outer mandrel dimension $d_{omf}$, and (iii) cross-sectional opening dimension $d_o$ typically refers to a diameter, but may in some embodiments refer to a largest dimension across or circumferencing a given component.

2. The method of embodiment 1, wherein a force used to separate the removable core mandrel 100 from the polymer shell 2 causes a reduction of the initial cross-sectional outer mandrel dimension $d_{omi}$ to the final cross-sectional outer mandrel dimension $d_{omf}$.

3. The method of embodiment 1 or 2, wherein a force used to separate the removable core mandrel 100 from the polymer shell 2 causes a reduction of the initial cross-sectional outer mandrel dimension $d_{omi}$ to the final cross-sectional outer mandrel dimension $d_{omf}$ and the force extends along an axial direction A (see, for example, axial direction A shown in FIG. 10) of the removable core mandrel 100.

4. The method of any one of embodiments 1 to 3, wherein said separating step comprises repositioning one or more first surface portions 1108 (e.g., surface portions corresponding to surface portions along each of the connectable mandrel blade 108 shown in FIGS. 9A-9B) of the outer profile surface 110 relative to one or more second surface portions 1107 (e.g., surface portions corresponding to surface portions along each of the connectable mandrel blade 107 shown in FIGS. 9A-9B) of the outer profile surface 110.

5. The method of any one of embodiments 1 to 4, wherein said separating step comprises disconnecting one or more first surface portions 1108 (e.g., surface portions corresponding to surface portions along each of the connectable mandrel blade 108 shown in FIGS. 9A-9B) of the outer profile surface 110 from one or more second surface portions 1107 (e.g., surface portions corresponding to surface portions along each of the connectable mandrel blade 107 shown in FIGS. 9A-9B) of the outer profile surface 110.

6. The method of any one of embodiments 1 to 5, wherein the removable core mandrel 100 comprises a central core mandrel 101 and a set of one or more connectable mandrel blades 102, each connectable mandrel blade 102 of the one or more connectable mandrel blades 102 being connectable to the central mandrel core 101, and said separating step comprises altering a position of one or more of the one or more connectable mandrel blades 102 relative to the central core mandrel 101.

7. The method of any one of embodiments 1 to 6, wherein the removable core mandrel 100 comprises a central core mandrel 101 and a set of one or more connectable mandrel blades 102, each connectable mandrel blade 102 of the one or more connectable mandrel blades 102 being connectable to the central mandrel core 101, and said separating step comprises disengaging one or more of the one or more connectable mandrel blades 102 from the central core mandrel 101.

8. The method of any one of embodiments 1 to 7, wherein the removable core mandrel 100 comprises a central core mandrel 101 and a set of one or more connectable mandrel blades 102, each connectable mandrel blade 102 of the one or more connectable mandrel blades 102 being connectable to the central mandrel core 101, and said separating step comprises a first separating step in which the central core mandrel 101 is separated from the polymer shell 2, and a second separating step in which one or more of the one or more connectable mandrel blades 102 is separated from the polymer shell 2 after said first separating step.

9. The method of any one of embodiments 6 to 8, further comprising: assembling the removable core mandrel 100 prior to placing at least a portion of the removable core mandrel 100 into a mold 150 (see, for example, mold 150), said assembling step comprising attaching the set of one or more connectable mandrel blades 102 onto the central mandrel core 101.

10. The method of any one of embodiments 1 to 9, wherein said separating step comprises removing the removable core mandrel 100 from the polymer shell 2.

Figure 8C:
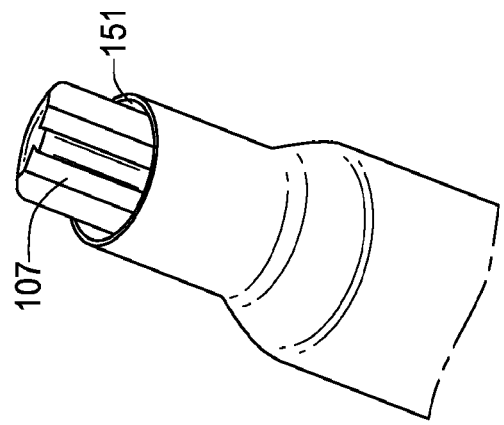
FIGS. 8A-8C depict views showing (i) extraction of and (ii) relative size of (1) an exemplary central core mandrel component and (2) exemplary types of connectable mandrel blades relative to an exemplary neck diameter of exemplary composite ammunition casing.
Figure 8B:
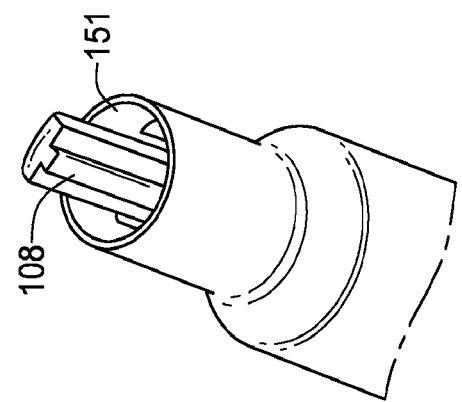
Figure 8A:
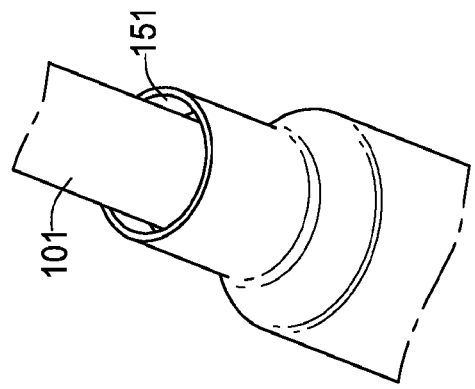

11. The method of any one of embodiments 1 to 10, wherein said separating step comprises removing the removable core mandrel 100 from a single outlet 151 within the polymer shell 2. See, for example, single outlet 151 shown in FIGS. 8A-8C).

12. The method of any one of embodiments 1 to 11, wherein said separating step comprises removing the removable core mandrel 100 from a single outlet 151 within the polymer shell 2, the single outlet 151 being proximate the internal opening 25 within the polymer shell 2.

13. The method of any one of embodiments 1 to 12, wherein said overmolding step comprises covering at least a portion of the removable core mandrel 100 with at least one molten polymer (see, polymer shell 2).

14. The method of any one of embodiments 1 to 12, further comprising: placing at least a portion of the removable core mandrel 100 within a mold 150 prior to said overmolding step, the mold 150 being sized to surround at least a portion of the removable core mandrel 100.

15. The method of any one of embodiments 1 to 14, further comprising: introducing the at least one polymer or polymer-forming material into a mold 150 containing at least a portion of the removable core mandrel 100 so as to coat the portion of the removable core mandrel 100.

16. The method of any one of embodiments 1 to 14, further comprising: placing one or more mold inserts 152 into a mold 150 along with the removable core mandrel 100, the mold 150 being sized to surround (i) at least a portion of the removable core mandrel 100, and (ii) at least a portion of each of the one or more mold inserts 152.

17. The method of any one of embodiments 1 to 14 and 16, further comprising: placing one or more mold inserts 152 into a mold 150 along with the removable core mandrel 100, the mold 150 being sized to surround (i) at least a portion of the removable core mandrel 100, and (ii) at least a portion of each of the one or more mold inserts 152, wherein at least one mold insert 152 comprises at least one ejection insert 109 sized to extend over one end 154 of the removable core mandrel 100.

18. The method of any one of embodiments 1 to 14 and 16 to 17, further comprising: placing one or more mold inserts 152 into a mold 150 along with the removable core mandrel 100, the mold 150 being sized to surround (i) at least a portion of the removable core mandrel 100, and (ii) at least a portion of each of the one or more mold inserts 152, wherein at least one mold insert 152 comprises at least one metal bushing 3.

19. The method of any one of embodiments 16 to 18, further comprising: introducing the at least one polymer or polymer-forming material into a mold 150 containing (i) at least a portion of the removable core mandrel 100 and (ii) the one or more mold inserts 152 so as to coat the portion of the removable core mandrel 100 and at least a portion of each of the one or more mold inserts 152.

20. The method of any one of embodiments 16 to 19, further comprising: introducing the at least one polymer or polymer-forming material into a mold 150 containing (i) at least a portion of the removable core mandrel 100 and (ii) the one or more mold inserts 152 so as to coat the portion of the removable core mandrel 100 and at least a portion of each the one or more mold inserts 152, wherein at least one mold insert 152 forms an overmolded component (e.g., metal bushing 3) of the molded object 1.

21. The method of any one of embodiments 16 to 20, wherein said separating step comprises removing the removable core mandrel 100 through at least one of the one or more mold inserts 152.

22. The method of any one of embodiments 16 to 21, wherein the polymer shell 2 is formed by said overmolding step onto at least one of the one or more mold inserts 152 in a single step without any type of additional assembly prior to or subsequent to said overmolding step.

23. The method of any one of embodiments 6 to 22, said overmolding step comprises positioning a portion of the central core mandrel 101 in a mold 150, the portion of the central core mandrel 101 comprising a cylindrical region 155 and a faceted surface 156 where the set of one or more connectable mandrel blades 102 are assembled. See, for example, FIG. 10.

24. The method of any one of embodiments 6 to 23, wherein both (i) a diameter of the central core mandrel 101 within a faceted surface area 156 of the central core mandrel 101, and (ii) an arc length $a_L$ of any one of the connectable mandrel blades 102 is smaller than the cross-sectional opening dimension $d_o$ (i.e., an inner diameter of a cartridge neck 21 of a composite ammunition casing 1). See, for example, the exemplary arc lengths $a_L$ of connectable mandrel blades 102 in FIGS. 7A-7B.

25. The method of any one of embodiments 6 to 24, wherein said separation step comprises a removable core mandrel 100 disassembly process which begins with extraction of the central core mandrel 101 by pulling the central core mandrel 101 in an axial direction A while said molded object 1 is held firmly.

26. The method of embodiment 25, wherein the removable core mandrel 100 disassembly process further comprises extraction of one or more of the connectable mandrel blades 102 by applying external pressure onto the polymer shell 2 of the molded object 1, optionally with a vibratory motion.

27. The method of embodiment 25 or 26, wherein the connectable mandrel blades 102 are removed from the polymer shell 2 of the molded object 1 through the internal opening 25 in a direction A parallel to a dissecting axis 157 of (i) the molded object 1 and (ii) the internal opening 25. See, for example, FIG. 11.

28. The method of any one of embodiments 6 to 27, wherein one or more of the connectable mandrel blades 102 (i.e., blades 108) are detached from an internal wall 26 of the polymer shell 2 via blade movement caused by an angled surface 159 along a faceted surface 156 of the central core mandrel 101.

29. The method of embodiment 28, wherein any of the connectable mandrel blades 102 that are not detached from the internal wall 26 by the blade movement caused by the angled surface 159 (i.e., blades 107) are released using an externally applied compression stress on the polymer shell 2.

30. The method of any one of embodiments 1 to 29, further comprising: removing the molded object 1 from a mold 150 after said overmolding step.

31. The method of any one of embodiments 6 to 30, wherein the retractable mandrel core 100 used to mold the powder shell 2 and a powder chamber 5 therein is introduced into a mold 150 before injection and removed from the mold 150 after injection so that the polymer shell 2 is attached thereto.

32. The method of any one of embodiments 1 to 29, further comprising: removing the molded object 1 from a mold 150 after said separating step.

33. The method of any one of embodiments 1 to 32, further comprising: positioning a projectile 6 within an open end 151 of the polymer shell 2.

34. The method of any one of embodiments 18 to 33, further comprising: positioning a projectile 6 within an open end 151 of the polymer shell 2, the open end 151 being opposite the metal bushing 3.

35. The method of embodiment 33 or 34, further comprising: applying an adhesive 50 so as to be positioned between the projectile 6 and a balancing area 40 of the polymer shell 2. See, for example, FIG. 6.

36. The method of any one of embodiments 18 to 35, wherein said method comprises forming a composite ammunition casing 1 comprising the polymer shell 2 and the metal bushing 3 contained partially therein, wherein an outer surface 29 of the polymer shell 2 provides an external shape according to an ammunition caliber, and an inner surface 28 of the polymer shell 2 forms a projectile adjustment area 4 and a powder chamber 5.

37. The method of any one of embodiments 18 to 36, wherein said method comprises forming a composite ammunition casing 1 comprising the polymer shell 2 and a metal bushing 3 contained partially therein, wherein an outer surface 29 of the polymer shell 2 provides an external shape of a cartridge comprising a cartridge body 20, a cartridge shoulder 22 and a cartridge neck 21.

Apparatus for Making Molded Objects Embodiments:

38. An apparatus for performing the method of any one of embodiments 1 to 37, said apparatus comprising: a removable core mandrel 100 comprising a central core mandrel 101 and a set of one or more connectable mandrel blades 102, each connectable mandrel blade 102 of the one or more connectable mandrel blades 102 being connectable to the central mandrel core 101, wherein said removable core mandrel 100 has (i) an initial cross-sectional outer mandrel dimension $d_{omi}$ when said one or more connectable mandrel blades 102 are in a first (i.e., connected) position relative to said central core mandrel 101, and (ii) a final cross-sectional outer mandrel dimension $d_{omf}$ when said one or more connectable mandrel blades 102 are in a second (i.e., disconnected) position relative to said central core mandrel 101, with $d_{omi} > d_{omf}$.

39. The apparatus of embodiment 38, wherein at least an outer surface portion 156 of said central core mandrel 101 comprises a surface geometry 103 that enables connection of said set of one or more connectable mandrel blades 102 to said central core mandrel 101.

40. The apparatus of embodiment 38 or 39, wherein at least an outer surface portion 156 of said central core mandrel 101 comprises a surface geometry 103 (i.e., in the form of a faceted surface 156) that enables connection of said set of one or more connectable mandrel blades 102 to said central core mandrel 101, said surface geometry 103 comprising one or more axially-extending grooves 159 within an outer surface portion 156 of said central core mandrel 101.

41. The apparatus of any one of embodiments 38 to 40, wherein at least an outer surface portion 156 of said central core mandrel 101 comprises a surface geometry 103 that enables connection of said set of one or more connectable mandrel blades 102 to said central core mandrel 101, said surface geometry 103 comprising from about two to about twelve axially-extending grooves 159 (or any number of grooves between about 2 and about 12, e.g., 5 about grooves, or any range of number of grooves between 2 and 12, e.g., from about 4 to about 8 grooves) within an outer surface portion 156 of said central core mandrel 101.

42. The apparatus of any one of embodiments 38 to 41, wherein said set of one or more connectable mandrel blades 102 comprises from about two to about twelve connectable mandrel blades 102 (or any number of connectable mandrel blades 102 between about 2 and about 12, e.g., 5 about connectable mandrel blades 102, or any range of number of connectable mandrel blades 102 between 2 and 12, e.g., from about 4 to about 8 connectable mandrel blades 102).

43. The apparatus of any one of embodiments 38 to 42, wherein at least one of said connectable mandrel blades 102 within said set of one or more connectable mandrel blades 102 is disengagable from said central core mandrel 101 during separation of said removable core mandrel 100 from a molded object 1 formed thereon.

44. The apparatus of any one of embodiments 38 to 43, wherein a first subset of said connectable mandrel blades 108 within said set of one or more connectable mandrel blades 102 is supported along an outer surface portion 156 of said central core mandrel 101 via an inclined plane/surface 159 so that when said central core mandrel 101 is separated from a molded object 1 formed thereon, said first subset of said connectable mandrel blades 108 move inwards towards a center axis 157 of said central core mandrel 101 so as to unlock (i.e., displace) adjacent connectable mandrel blades 107 within a second subset of said connectable mandrel blades 102 that are not connected to said central core mandrel 101 via an inclined plane/surface 159.

45. The apparatus of any one of embodiments 38 to 44, wherein a first subset of said connectable mandrel blades 108 within said set of one or more connectable mandrel blades 102 is supported along an outer surface portion 156 of said central core mandrel 101 via an inclined plane/surface 159 so that when said central core mandrel 101 is separated from a molded object 1 formed thereon, said first subset of said connectable mandrel blades 108 move inwards towards a center axis 157 of said central core mandrel 101 so as to unlock (i.e., displace) adjacent connectable mandrel blades 107 within a second subset of said connectable mandrel blades 102 that are not connected to said central core mandrel 101 via an inclined plane/surface 159, each of said connectable mandrel blades 108 having a first overall shape/geometry that differs from a second overall shape/geometry of each of said adjacent connectable mandrel blades 107. See, for example, FIG. 7A.

46. The apparatus of any one of embodiments 38 to 45, wherein said set of one or more connectable mandrel blades 102 form an outer profile surface 104 of said removable core mandrel 100 when said one or more connectable mandrel blades 102 are in said first position relative to said central core mandrel 101.

47. The apparatus of any one of embodiments 38 to 46, wherein said set of one or more connectable mandrel blades 102 form an outer profile surface 104 of said removable core mandrel 100 when said one or more connectable mandrel blades 102 are in said first position relative to said central core mandrel 101, said outer profile surface 104 having a cylindrical cross-sectional shape 104, and said initial cross-sectional outer mandrel dimension $d_{omi}$ measures an inner diameter of said cylindrical cross-sectional shape 104. It should be noted that said set of one or more connectable mandrel blades 102 may form an outer profile surface 104 having any desired shape. Exemplary shapes include, but are not limited to, a cylindrical shape, a spherical shape, a pear shape, a box-like shape having a square or rectangular cross-sectional shape, etc.

48. The apparatus of any one of embodiments 38 to 47, wherein each blade 102 within said set of one or more connectable mandrel blades 102 independently has blade dimensions that enable a given blade 102 to pass through an internal opening 25 within a polymer shell 2 of the molded object 1, the internal opening 25 having a cross-sectional opening dimension $d_o$ with $d_{omi} > d_o \geq d_{omf}$.

49. The apparatus of any one of embodiments 38 to 48, further comprising: a mold 150 sized to surround at least a portion of said removable core mandrel 100 so that a polymer shell 2 in contact with an outer profile surface 104 of said removable core mandrel 100 may be formed between the outer profile surface 104 of the removable core mandrel 100 and an inner surface 1501 of the mold 150.
50. The apparatus of any one of embodiments 38 to 49, further comprising: one or more mold inserts 152, each of said one or more mold inserts 152 being sized so as to be at least partially positioned within a mold 150, the mold 150 being sized to surround (i) at least a portion of said removable core mandrel 100, and (ii) at least a portion of each of said one or more mold inserts 152. For example, in some embodiments, a given mold insert 152 may be sized so as to be partially positioned within a mold 150. In some embodiments, a given mold insert 152 may be sized so as to be completely positioned within a mold 150. In some embodiments, one mold insert 152 may be sized so as to be partially positioned within a mold 150, while another mold insert 152 may be sized so as to be completely positioned within the same mold 150.
51. The apparatus of any one of embodiments 38 to 50, further comprising: one or more mold inserts 152, each of said one or more mold inserts 152 being sized so as to be at least partially positioned within a mold 150, the mold 150 sized to surround (i) at least a portion of said removable core mandrel 100, and (ii) at least a portion of each of said one or more mold inserts 152, wherein said one or more mold inserts 152 comprise at least one ejection insert 109 sized to extend over one end 154 of said removable core mandrel 100.
52. The apparatus of any one of embodiments 38 to 51, further comprising: one or more mold inserts 152, each of said one or more mold inserts 152 being sized so as to be at least partially positioned within a mold 150, the mold 150 sized to surround (i) at least a portion of said removable core mandrel 100, and (ii) at least a portion of each of said one or more mold inserts 152, wherein said one or more mold inserts 152 comprise at least one mold insert 152 that forms an overmolded component (e.g., metal bushing 3) of the molded object 1.
53. The apparatus of any one of embodiments 38 to 52, further comprising: one or more mold inserts 152, each of said one or more mold inserts 152 being sized so as to be at least partially positioned within a mold 150, the mold 150 sized to surround (i) at least a portion of said removable core mandrel 100, and (ii) at least a portion of each of said one or more mold inserts 152, wherein said one or more mold inserts 152 comprise at least one mold insert 152 that forms an overmolded end component (e.g., metal bushing 3) of the molded object 1.
54. The apparatus of any one of embodiments 38 to 53, further comprising: one or more mold inserts 152, each of said one or more mold inserts 152 being sized so as to be at least partially positioned within a mold 150, the mold 150 sized to surround (i) at least a portion of said removable core mandrel 100, and (ii) at least a portion of each of said one or more mold inserts 152, wherein said one or more mold inserts 152 comprise at least one overmolded metal bushing 3.
55. The apparatus of any one of embodiments 38 to 54, further comprising: an injection system 170 capable of providing (i) the at least one polymer or (ii) reactants for forming the at least one polymer onto the removable core mandrel 100. See, for example, FIG. 11. It should be understood that any injection system 170 capable of providing (i) the at least one polymer or (ii) reactants for forming the at least one polymer onto the removable core mandrel 100 may be used in the present invention.
56. The apparatus of any one of embodiments 38 to 55, wherein each of (i) the central core mandrel 101 and (ii) the set of one or more connectable mandrel blades 102 independently comprises a rigid material. Suitable rigid materials include, but are not limited to, metals, ceramics, polymers, and composite materials (e.g., fiber-reinforced materials).
57. The apparatus of any one of embodiments 50 to 56, wherein each of (i) the mold 150 and (ii) the one or more mold inserts 152 independently comprises a rigid material. Suitable rigid materials include, but are not limited to, metals, ceramics, polymers, and composite materials (e.g., fiber-reinforced materials).

Molded Object Embodiments:
58. A molded object 1 formed by the method of any one of embodiments 1 to 37.
59. The molded object 1 of embodiment 58, wherein said molded object 1 comprises the polymer shell 2.
60. The molded object 1 of embodiment 58 or 59, wherein said molded object 1 comprises the polymer shell 2 and at least one mold insert 152, said polymer shell 2 extending along at least a portion of an external surface 31 of said at least one mold insert 152.
61. The molded object 1 of any one of embodiments 58 to 60, wherein said molded object 1 comprises the polymer shell 2 and at least one mold insert 152, said polymer shell 2 extending along at least a portion of an external surface 31 of said at least one mold insert 152, and said at least one mold insert 152 representing an overmolded end component (e.g., metal bushing 3) of said molded object 1.
62. The molded object 1 of any one of embodiments 58 to 61, wherein said molded object 1 comprises a composite ammunition casing 1 comprising the polymer shell 2 and a metal bushing 3 contained at least partially therein and integrated by said overmolding step. In other embodiments (not shown), composite ammunition casing 1 comprises polymer shell 2 and metal bushing 3 contained completely therein such that only an end 32 of metal bushing 3 is exposed after said overmolding step.
63. The molded object 1 of any one of embodiments 58 to 62, wherein said molded object 1 comprises a composite ammunition casing 1 comprising the polymer shell 2 and a metal bushing 3 contained at least partially therein, wherein an outer surface 29 of the polymer shell 2 provides an external shape according to an ammunition caliber, and an inner surface 28 of the polymer shell 2 forms a projectile adjustment area 4 and a powder chamber 5.
64. The molded object 1 of any one of embodiments 58 to 63, wherein said molded object 1 comprises a composite ammunition casing 1 comprising the polymer shell 2 and a metal bushing 3 contained at least partially therein, wherein an outer surface 29 of the polymer shell 2 provides an external shape of a cartridge 1 comprising a cartridge body 20, a cartridge shoulder 22 and a cartridge neck 21.
65. The molded object 1 of any one of embodiments 58 to 64, wherein the metal bushing 3 integrated with the polymer shell 2 is made by machining, casting, sintering or stamping.
66. The molded object 1 of any one of embodiments 58 to 65, wherein the metal bushing 3 has on its outside surface 31, an extraction rim 30, one or more housing grooves/notches 10 and a cone 311 sized to fit onto an extractor (not shown), said extraction rim 30 and said cone 311 being visible after the overmolding step.

Figure 6:
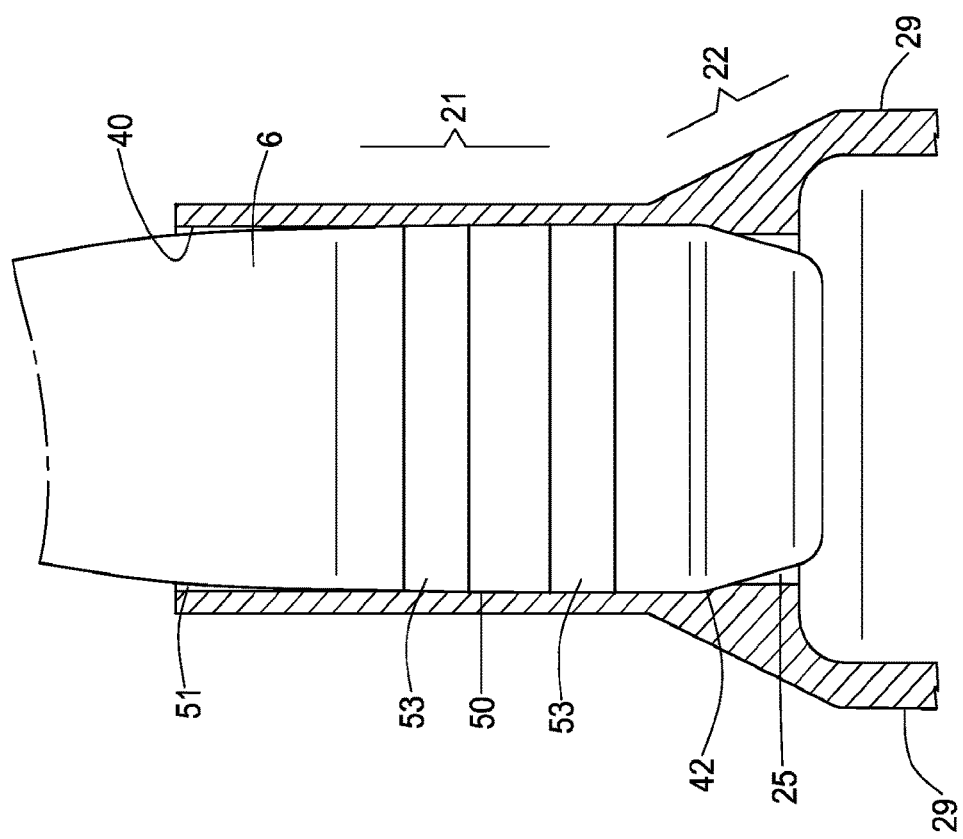
FIG. 6 depicts a close-up, detailed view of the sealing effect and projectile fixture of the projectile within the exemplary assembled ammunition cartridge shown in FIG. 1.

67. The molded object 1 of any one of embodiments 62 to 66, wherein the metal bushing 3 comprises a primer pocket 7 and a hole 8 that connects the primer pocket 7 with a powder chamber 5.
68. The molded object 1 of any one of embodiments 62 to 67, wherein an inner hole 8 of the metal bushing 3 extends from a primer pocket 7 and communicates with a powder chamber 5 through a pipe 9, forming a polymer wall 210 around said pipe 9 so as to envelope said pipe 9 and separate the powder chamber 5 from the metal bushing 5.
69. The molded object 1 of any one of embodiments 62 to 68, wherein the metal bushing 3 has notches 10 along its outer surface 31 so as to fix said metal bushing 3 to the polymer shell 2 so as to resist an extraction force of a primer 11 while shooting.
70. The molded object 1 of any one of embodiments 62 to 69, wherein the metal bushing 3 has a sharp edge 12 at an end 122 of a pipe 9 to reduce a metal bushing section exposed to pressure during firing and to absorb bushing machining tolerances during the overmolding step.
71. The molded object 1 of any one of embodiments 64 to 70, wherein an inside surface 410 of the cartridge neck 21 contains a balancing area 40, one or more sealing slots 41, and at least one shelf 42.
72. The molded object 1 of embodiment 71, wherein the one or more sealing slots 41 are formed by one or more spaces 41 between a set of vertical ribs 43 contained within the inner surface 410 of the cartridge neck 21.
73. The molded object 1 of embodiment 72, wherein the vertical ribs 43 and the one or more sealing slots 41 are distributed equidistant along the inner surface 410 of the cartridge neck 21.
74. The molded object 1 of any one of embodiments 71 to 73, wherein a slot depth of each of the one or more sealing slots 41 is up to about 0.5 mm (or any length greater than 0 mm and up to 0.5 mm, in increments of 0.01 mm, e.g., 0.21 mm, or any range of length greater than 0 mm and up to 0.5 mm, in increments of 0.01 mm, e.g., from about 0.01 mm to about 0.08 mm).
75. The molded object 1 of any one of embodiments 71 to 74, wherein a slot depth of each of the one or more sealing slots 41 is about 0.05 mm.
76. The molded object 1 of any one of embodiments 71 to 75, wherein the one or more sealing slots 41 are inscribed in a circle having a circle diameter equal to an outer diameter of a projectile 6.
77. The molded object 1 of any one of embodiments 72 to 76, where the vertical ribs 43 and the one or more sealing slots 41 are placed between the balancing area 40 and the at least one shelf 42.
78. The molded object 1 of any one of embodiments 71 to 77, wherein the balancing area 40 is located near a casing mouth 411 and comprises a cylindrical surface 410 whose diameter matches a diameter of the one or more sealing slots 41.
79. The molded object 1 of any one of embodiments 71 to 78, wherein the balancing area 40 has a width that is equal to or greater than a width of the one or more sealing slots 41.
80. The molded object 1 of any one of embodiments 62 to 79, further comprising a projectile 6 fixed within one end 151 of said polymer shell 2 opposite said metal bushing 3.
81. The molded object 1 of any one of embodiments 62 to 80, further comprising a projectile 6 fixed within one end 151 of said polymer shell 2 opposite said metal bushing 3, and an adhesive 50 applied between said projectile 6 and a balancing area 40 of said composite ammunition casing 1. As shown in FIG. 6, adhesive 50 forms a mechanical bond 51 between projectile 6 and balancing area 40 of composite ammunition casing 1.
82. The molded object 1 of embodiment 81, wherein the adhesive 50 is present within the one or more sealing slots 41.
83. The molded object 1 of embodiment 81 or 82, wherein the projectile 6 is fixed in place via penetration of the adhesive 50 by capillary action along the balancing area 40 and the one or more sealing slots 41.
84. The molded object 1 of any one of embodiments 81 to 83, wherein the adhesive 50 used to fix the projectile 6, when solidified, creates a mechanical bond 51 between an inner surface 410 of the cartridge neck 21 and said projectile 6 so as to prevent accidental separation of said projectile 6 from said composite ammunition casing 1.
85. The molded object 1 of any one of embodiments 81 to 84, wherein the adhesive 50, when solidified, generates a mechanical locking ring 51 attached to an inner surface 410 of the cartridge neck 21, filling a shape of a crimp groove 53, when present, in said projectile 6. See, for example, FIG. 6.
86. The molded object 1 of any one of embodiments 62 to 85, wherein an interior volume 5 of said polymer shell 2 forms a powder chamber 5 of said composite ammunition casing 1, said powder chamber 5 being molded via the retractable mandrel core 100.
87. The molded object 1 of any one of embodiments 62 to 86, wherein a powder chamber 5 of said composite ammunition casing 1 is formed via the central core mandrel 101 and the set of one or more connectable mandrel blades 102 mounted on the central core mandrel 101, which together shape an inner diameter of the powder chamber 5.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

Example 1—Preparation of Molded Objects

Exemplary molded objects, in the form of composite ammunition casings, as shown in FIGS. 1-6 were prepared using the apparatus and method steps depicted in FIGS. 7A-11. In some cases, composite ammunition casings such as shown in FIGS. 1-6 were prepared by injection molding polymer resin, such as a polyamide, to form composite ammunition casings for 9 mm ammunition.

The above procedure, or a variation thereof, was used to form ammunition suitable for use in a variety of commercially available rifles, pistols, machine and submachine guns, and air-guns (e.g., pistols and other hand guns, rifles, machine and submachine guns, etc.).

It should be understood that although the above-described methods, apparatus, and/or molded objects (e.g., composite ammunition casings) are described as "comprising" one or more components or steps, the above-described methods, apparatus, and/or molded objects may "comprise," "consists of," or "consist essentially of" the above-described components, features or steps of the methods, apparatus, and/or molded objects. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, a method, apparatus, and/or molded object that "comprises" a list of elements (e.g., components, features, or steps) is not necessarily limited to only those elements (or components or steps), but may include other elements (or components or steps) not expressly listed or inherent to the method, apparatus, and/or molded object.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define a method, apparatus, and/or molded object that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Further, it should be understood that the herein-described methods, apparatus, and/or molded objects may comprise, consist essentially of, or consist of any of the herein-described components, features and steps, as shown in the figures with or without any feature(s) not shown in the figures. In other words, in some embodiments, the methods, apparatus, and/or molded objects of the present invention do not have any additional features other than those shown in the figures, and such additional features, not shown in the figures, are specifically excluded from the methods, apparatus, and/or molded objects. In other embodiments, the methods, apparatus, and/or molded objects of the present invention do have one or more additional features that are not shown in the figures.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A method of making a composite ammunition casing comprising a metal bushing containing a primer pocket therein, at least partially overmolded within a polymer shell, the polymer shell (1) having a first polymer shell end along an outer surface of the metal bushing, (2) a second polymer shell end opposite the first polymer shell end, the second polymer shell end having a single opening therein, and (3) an internal opening within the polymer shell and positioned between an overmolded portion of the metal bushing and the single opening, said method comprising:

overmolding a removable core mandrel and the overmolded portion of the metal bushing with at least one polymer or polymer-forming material, the at least one polymer or polymer-forming material contacting an outer profile surface of the removable core mandrel and an outer surface profile of the overmolded portion of the metal bushing so as to form a portion of an inner polymer shell surface of the polymer shell; and separating the removable core mandrel from the polymer shell to form the composite ammunition casing, said separating step comprising:
   (i) reducing a cross-sectional outer mandrel dimension of the removable core mandrel from an initial cross-sectional outer mandrel dimension $d_{omi}$ to a final cross-sectional outer mandrel dimension $d_{omf}$ so that the removable core mandrel passes through the internal opening within the polymer shell, the internal opening having a cross-sectional opening dimension $d_o$ with $d_{omi} > d_o \geq d_{omf}$, and
   (ii) separating an overmolded portion of the removable core mandrel having the initial cross-sectional outer mandrel dimension $d_{omi}$ from the polymer shell by passing the overmolded portion of the removable core mandrel through (a) the internal opening within the polymer shell and (b) the single opening at the second polymer shell end.

2. The method of claim 1, further comprising:
   placing one or more mold inserts into a mold along with the removable core mandrel, the mold being sized to surround (i) at least a portion of the removable core mandrel, and (ii) at least a portion of each of the one or more mold inserts, wherein at least one mold insert comprises at least one ejection insert sized to extend over one end of the removable core mandrel.

3. The method of claim 2, wherein said separating step comprises removing the removable core mandrel through at least one of the at least one ejection insert.

4. The method of claim 1, further comprising:
   placing the metal bushing into a mold along with the removable core mandrel, the mold being sized to surround (i) at least a portion of the removable core mandrel, and (ii) the overmolded portion of the metal bushing.

5. The method of claim 4, further comprising:
   introducing the at least one polymer or polymer-forming material into the mold containing (i) the portion of the removable core mandrel and (ii) the metal bushing so as to coat the portion of the removable core mandrel and the overmolded portion of the metal bushing, wherein the overmolded portion of the metal bushing forms an overmolded component of the composite ammunition casing.

6. The method of claim 4, wherein an outer surface of the polymer shell provides an external shape according to an ammunition caliber, and the inner polymer shell surface of the polymer shell forms a projectile adjustment area and a powder chamber.

7. The method of claim 4, wherein an outer surface of the polymer shell provides an external shape of a cartridge comprising a cartridge body, a cartridge shoulder and a cartridge neck.

8. The method of claim 1, further comprising:
removing the composite ammunition casing from a mold after said separating step.

9. The method of claim 8, further comprising:
positioning a projectile within the single opening of the second polymer shell end of the polymer shell.

10. A method of making a composite ammunition casing comprising a metal bushing containing a primer pocket therein, at least partially overmolded within a polymer shell, the polymer shell (1) having a first polymer shell end along an outer surface of the metal bushing, (2) a second polymer shell end opposite the first polymer shell end, the second polymer shell end having a single opening therein and (3) an internal opening within the polymer shell and positioned between an overmolded portion of the metal bushing and the single opening, said method comprising:
overmolding (i) a removable core mandrel, (ii) at least one ejection insert positioned over a portion of the removable core mandrel, and (iii) the overmolded portion of the metal bushing with at least one polymer or polymer-forming material, the at least one polymer or polymer-forming material contacting (i) an outer profile surface of the at least one ejection insert, (ii) an outer profile surface of the removable core mandrel, and (iii) an outer surface profile of the overmolded portion of the metal bushing so as to form an inner polymer shell surface of the polymer shell; and
separating the removable core mandrel and the at least one ejection insert from the polymer shell to form the composite ammunition casing, said separating step comprising:
(i) reducing a cross-sectional outer mandrel dimension of the removable core mandrel from an initial cross-sectional outer mandrel dimension $d_{omi}$ to a final cross-sectional outer mandrel dimension $d_{omf}$ so that the removable core mandrel passes through the internal opening within the polymer shell, the internal opening having a cross-sectional opening dimension $d_o$ with $d_{omi} > d_o \geq d_{omf}$; and
(ii) separating the removable core mandrel from the polymer shell by passing an overmolded portion of the removable core mandrel having the initial cross-sectional outer mandrel dimension $d_{omi}$ through (a) the internal opening within the polymer shell, and (b) the single opening at the second polymer shell end.

11. The method of claim 10, wherein said separating step further comprises removing the at least one ejection insert from the removable core mandrel.

12. The method of claim 10, wherein said separating step further comprises passing the overmolded portion of the removable core mandrel through an opening extending through the at least one ejection insert.

13. The method of claim 10, further comprising:
after said overmolding step, positioning a projectile within the single opening of the second polymer shell end of the polymer shell.

14. The method of claim 10, wherein an outer surface of the polymer shell provides an external shape according to an ammunition caliber, and the inner polymer shell surface of the polymer shell forms a projectile adjustment area and a powder chamber.

15. A method of making a composite ammunition casing comprising a metal bushing containing a primer pocket therein, at least partially overmolded within a polymer shell, the polymer shell (1) having a first polymer shell end along an outer surface of the metal bushing, (2) a second polymer shell end opposite the first polymer shell end, the second polymer shell end having a single opening therein and (3) an internal opening within the polymer shell and positioned between an overmolded portion of the metal bushing and the single opening, said method comprising:
overmolding (i) a removable core mandrel, and (ii) the overmolded portion of the metal bushing with at least one polymer or polymer-forming material, the at least one polymer or polymer-forming material contacting (i) an outer profile surface of the removable core mandrel, and (ii) an outer surface profile of the overmolded portion of the metal bushing so as to form an inner polymer shell surface of the polymer shell; and
removing the removable core mandrel from the polymer shell to form the composite ammunition casing, said removing step comprising:
(i) reducing a cross-sectional outer mandrel dimension of the removable core mandrel from an initial cross-sectional outer mandrel dimension $d_{omi}$ to a final cross-sectional outer mandrel dimension $d_{omf}$ so that the removable core mandrel passes through the internal opening within the polymer shell, the internal opening having a cross-sectional opening dimension $d_o$ with $d_{omi} > d_o \geq d_{omf}$; and
(ii) separating the removable core mandrel from the polymer shell by removing an overmolded portion of the removable core mandrel having the initial cross-sectional outer mandrel dimension $d_{omi}$ through (a) the internal opening within the polymer shell, and (b) the single opening at the second polymer shell end.

16. The method of claim 15, further comprising:
after said overmolding step, positioning a projectile within the single opening of the second polymer shell end of the polymer shell.

17. The method of claim 15, wherein an outer surface of the polymer shell provides an external shape according to an ammunition caliber, and the inner polymer shell surface of the polymer shell forms a projectile adjustment area and a powder chamber.

* * * * *